(12) United States Patent
Kaufman (10) Patent No.: US 11,260,898 B2
(45) Date of Patent: Mar. 1, 2022

(54) STEERING SYSTEM FOR A VEHICLE

(71) Applicant: Tesla, Inc., Palo Alto, CA (US)

(72) Inventor: Mark Kaufman, Pacifica, CA (US)

(73) Assignee: Tesla, Inc., Austin, TX (US)

( * ) Notice: Subject to any disclaimer, the term of this patent is extended or adjusted under 35 U.S.C. 154(b) by 334 days.

(21) Appl. No.: 16/276,163

(22) Filed: Feb. 14, 2019

(65) Prior Publication Data
US 2019/0300048 A1    Oct. 3, 2019

Related U.S. Application Data

(60) Provisional application No. 62/649,375, filed on Mar. 28, 2018.

(51) Int. Cl.
| | | |
|---|---|---|
| *B62D 5/04* | (2006.01) | |
| *B62D 7/20* | (2006.01) | |
| *B62D 7/16* | (2006.01) | |
| *B62D 7/22* | (2006.01) | |
| *B62D 7/12* | (2006.01) | |

(Continued)

(52) U.S. Cl.
CPC ............ *B62D 5/0421* (2013.01); *B62D 5/04* (2013.01); *B62D 5/0403* (2013.01); *B62D 5/0424* (2013.01); *B62D 7/12* (2013.01); *B62D 7/166* (2013.01); *B62D 7/20* (2013.01);

(Continued)

(58) Field of Classification Search
CPC ...... B62D 5/0421; B62D 7/12; B62D 5/0424; B62D 7/20; B62D 7/166; B62D 7/228; B62D 5/0403; B62D 5/04; F16H 49/001; F16H 1/28; F16H 1/16

See application file for complete search history.

(56) References Cited

U.S. PATENT DOCUMENTS

| 6,179,083 B1 * | 1/2001 | Yamauchi | B62D 5/008 180/443 |
|---|---|---|---|
| 2002/0096388 A1 * | 7/2002 | Fujiwara | B62D 5/008 180/444 |

(Continued)

FOREIGN PATENT DOCUMENTS

| DE | 102015217046 A1 | 3/2017 |
|---|---|---|
| DE | 102017200141 A1 | 7/2017 |

(Continued)

OTHER PUBLICATIONS

International Searching Authority; International Search Report and Written Opinion; International Application No. PCT/IB2019/052289; dated Jul. 11, 2019; 13 pgs.

*Primary Examiner* — Minnah L Seoh
*Assistant Examiner* — Marlon A Arce
(74) *Attorney, Agent, or Firm* — Knobbe, Martens, Olson & Bear, LLP (57) ABSTRACT

A steering system for a vehicle includes a drive motor having a motor shaft. The steering system also includes a first gear reduction stage for receiving a first rotational input from the motor shaft and providing a first rotational output. The steering system further includes a second gear reduction stage for receiving the first rotational output from the first gear reduction stage and providing a second rotational output. The second gear reduction stage may include at least one of a strain wave gearing, a worm drive, and a planetary gearing. The steering system includes an output shaft for receiving the second rotational output from the second gear reduction stage.

17 Claims, 7 Drawing Sheets

(51) Int. Cl.
*F16H 49/00* (2006.01)
*F16H 1/28* (2006.01)
*F16H 1/16* (2006.01)

(52) U.S. Cl.
CPC ............... *B62D 7/228* (2013.01); *F16H 1/16* (2013.01); *F16H 1/28* (2013.01); *F16H 49/001* (2013.01)

(56) References Cited

U.S. PATENT DOCUMENTS

| | | | |
|---|---|---|---|
| 2004/0182637 A1* | 9/2004 | Yamamori | B62D 5/0409 180/421 |
| 2012/0241244 A1* | 9/2012 | Escobedo | B62D 5/0421 180/444 |
| 2020/0283064 A1* | 9/2020 | Boyle | B60W 10/08 |

FOREIGN PATENT DOCUMENTS

| | | |
|---|---|---|
| DE | 102017201984 A1 | 8/2017 |
| EP | 1459959 A2 | 9/2004 |

* cited by examiner

STEERING SYSTEM FOR A VEHICLE

CROSS REFERENCE TO RELATED PATENTS

The present U.S. Utility Patent Application claims priority pursuant to 35 U.S.C. § 119(e) to U.S. Provisional Application No. 62/649,375, entitled "STEERING SYSTEM FOR A VEHICLE", filed Mar. 28, 2018, which is hereby incorporated herein by reference in its entirety and made part of the present U.S. Utility Patent Application for all purposes.

TECHNICAL FIELD

The present disclosure generally relates to a steering system for steering one or more steerable wheels of a vehicle. More particularly, the present disclosure relates to a power assist steering system for a vehicle.

BACKGROUND

Steering systems associated with vehicles are used to steer vehicle wheels during operation. Conventional steering systems are generally hydraulically operated to augment the steering effort exerted by a driver. Such hydraulically operated steering systems are typically bulky and space consuming as they include a number of components, for example, cylinders, pumps, hoses, control valves, etc. Additionally, hydraulically operated steering systems are complex in design, expensive and add to an overall cost of vehicle. Hydraulically operated steering systems are also less efficient and typically require a large amount of power for operation. Thus, there is a need for a new steering system having a simpler and compact structure with high operating efficiency to solve the aforementioned problems.

SUMMARY

This application discloses a steering system for a vehicle. The steering system includes a drive motor having a motor shaft. The steering system also includes a first gear reduction stage for receiving a first rotational input from the motor shaft and providing a first rotational output. A first gear meshes with a second gear of the first gear reduction stage via a helical gear mesh. The steering system further includes a second gear reduction stage for receiving the first rotational output from the first gear reduction stage and providing a second rotational output. The second gear reduction stage may include at least one of a strain wave gearing, a worm drive, and a planetary gearing. In case the second reduction stage is a strain wave gearing, the second gear reduction stage includes an ovular coupler, a flexible coupling, an outer spline, and a plurality of bearing members disposed between the ovular coupler and the flexible coupling. The steering system includes an output shaft for receiving the second rotational output from the second gear reduction stage.

In embodiments of the present disclosure, a steering system for a vehicle is provided. The steering system includes a drive motor having a motor shaft. The steering system also includes a first gear arranged to be rotated by the motor shaft. The steering system further includes a second gear rotatably driven by the first gear. A first gear meshes with the second gear via a helical gear mesh. The steering system includes an ovular coupler arranged to be rotated by the second gear. The steering system also includes a flexible coupling circumferentially surrounding the ovular coupler. The flexible coupling is elastically deformable by the ovular coupler during rotation. Further, a plurality of bearing members is disposed between the ovular coupler and the flexible coupling. The steering system further includes an outer spline meshed with the flexible coupling. The steering system includes an output shaft arranged to be rotated by the flexible coupling.

In embodiments, steering system for a vehicle having one or more steerable wheels is provided. The steering system includes a drive motor having a motor shaft. The steering system also includes a first gear arranged to be rotated by the motor shaft. The steering system further includes a second gear rotatably driven by the first gear. A first gear is meshed with the second gear via a helical gear mesh. The steering system includes an ovular coupler arranged to be rotated by the second gear. The steering system also includes a flexible coupling circumferentially surrounding the ovular coupler. The flexible coupling is elastically deformable by the ovular coupler during rotation. Further, a plurality of bearing members is disposed between the ovular coupler and the flexible coupling. The steering system further includes an outer spline meshed with the flexible coupling. The steering system includes an output shaft arranged to be rotated by the flexible coupling. The steering system also includes a pitman arm arranged to be rotated by the output shaft. The pitman arm is operably coupled to the one or more steerable wheels of the vehicle.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

Figure 1:
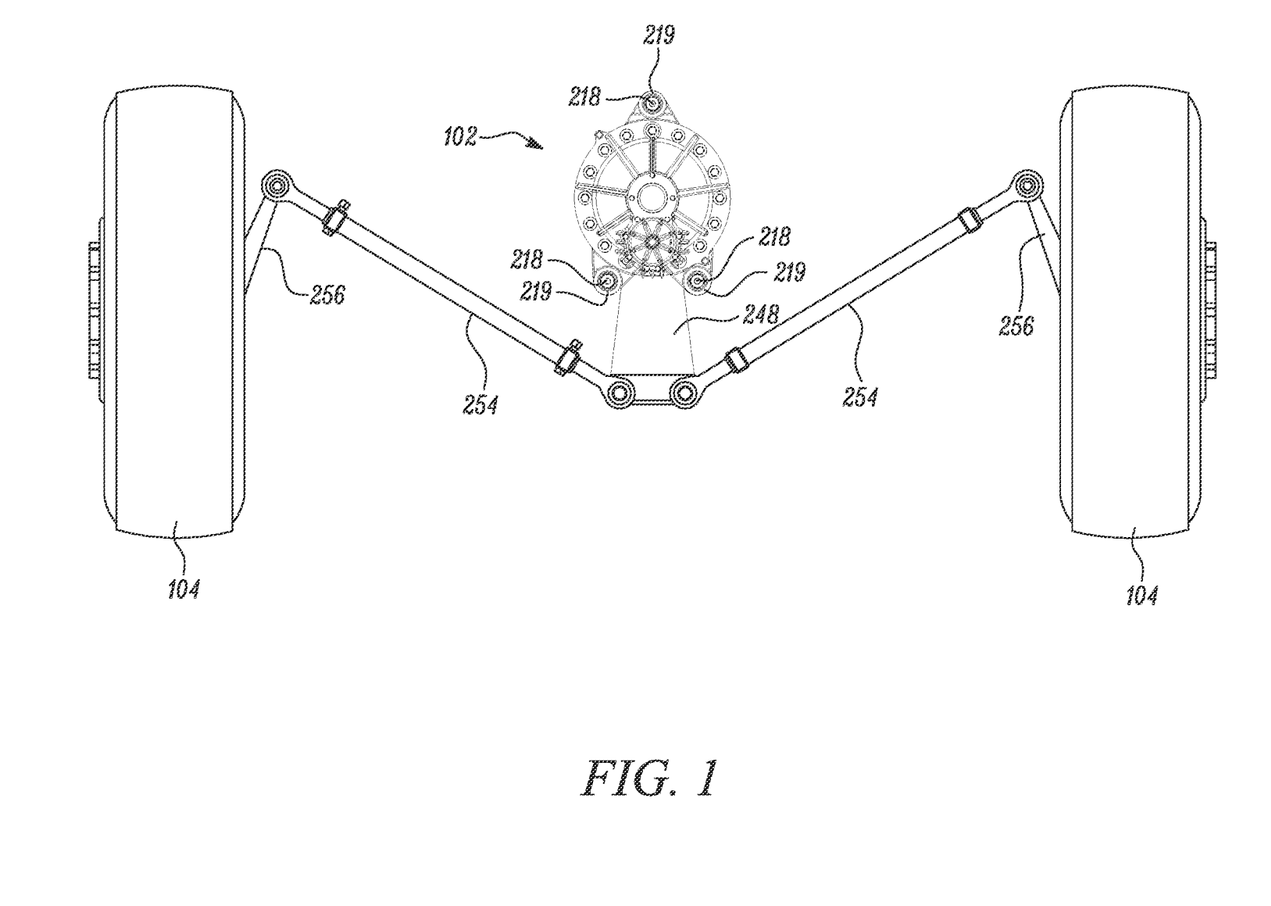
FIG. 1 illustrates a steering system for a vehicle, according to certain embodiments of the disclosure.

FIG. 1 illustrates a steering system 102 for a vehicle according to the present disclosure. In certain embodiments, the vehicle is an electric vehicle, a hybrid vehicle or a vehicle powered by an engine. In an embodiment, the vehicle is an autonomous vehicle. Alternatively, the vehicle is a semi-autonomous vehicle or a manually operated vehicle. Further, the vehicle may include any one of a car, truck, bus, etc. In the illustrated embodiment, steering system 102 is embodied as a power assist steering system. Steering system 102 is used to steer one or more steerable wheels 104 of vehicle. For illustrative purposes, two wheels 104 are shown in the accompanying figure. Both wheels 104 are embodied as steerable wheels that are steered by steering system 102, based on inputs from a driver or a controller (not shown in FIG. 1) of vehicle. In embodiments, four wheels 104 are steerable by steering system 102. In other embodiments, only one of the wheels 104 is steerable by steering system 102.

Steering system 102 is mounted on the vehicle using mechanical fasteners 218. More particularly, flanges 219 on a bottom cover 214 receive mechanical fasteners 218 for mounting steering system 102 on vehicle. In certain embodiments, steering system 102 includes a steering wheel (not shown) that is manually operated by driver of vehicle in order to steer wheels 104 via steering system 102. In one example, steering wheel is mechanically connected to steering system 102. In such an example, the steering wheel is coupled to steering system 102 through a steering column (not shown). Alternatively, steering system 102 is a steer-by-wire system that electronically controls the steering of wheels 104. The electronic control is based on manual inputs from driver or autonomous control by controller.

Figure 2A:
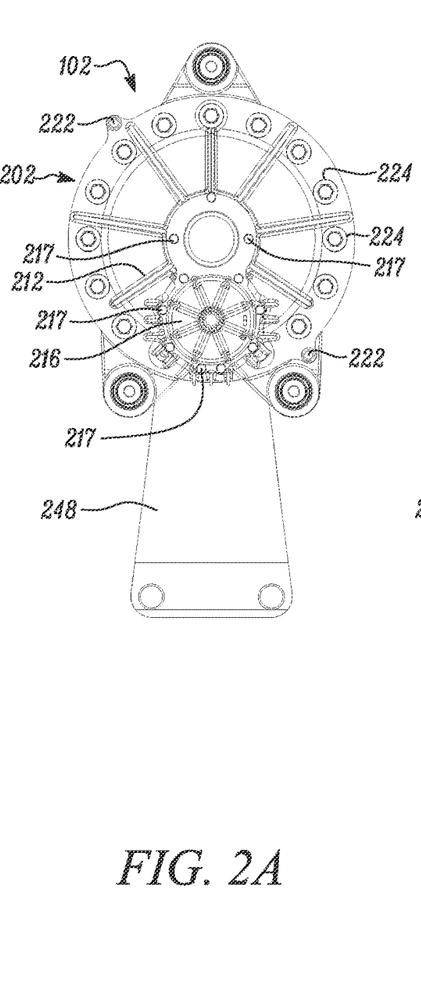
FIGS. 2A, 2B, and 2C illustrate different perspective views of the steering system, according to certain embodiments of the disclosure.
Figure 2B:
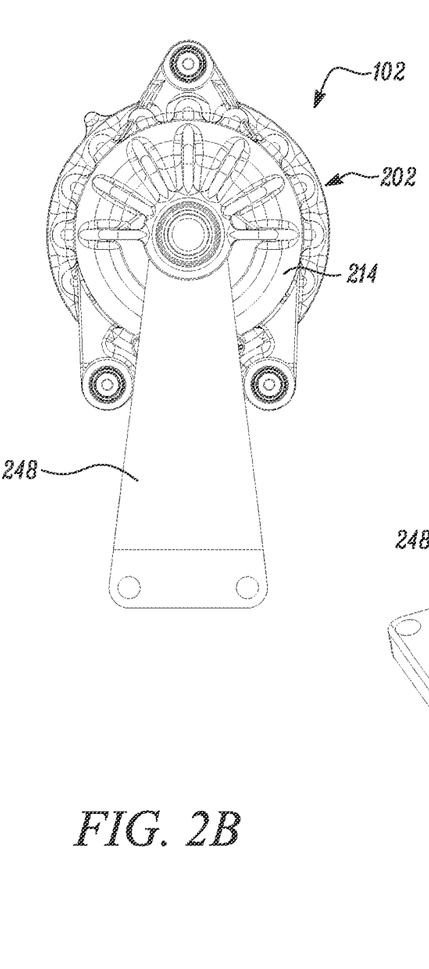
Figure 2C:
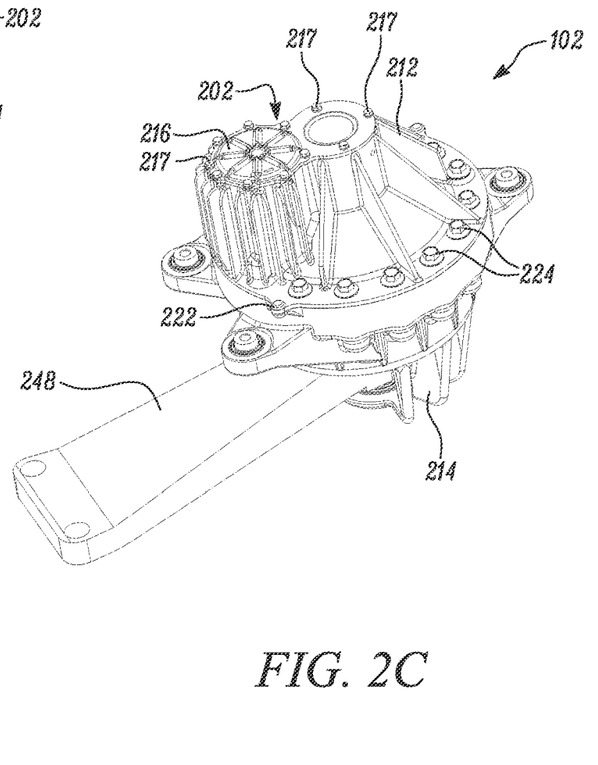
Figure 3:
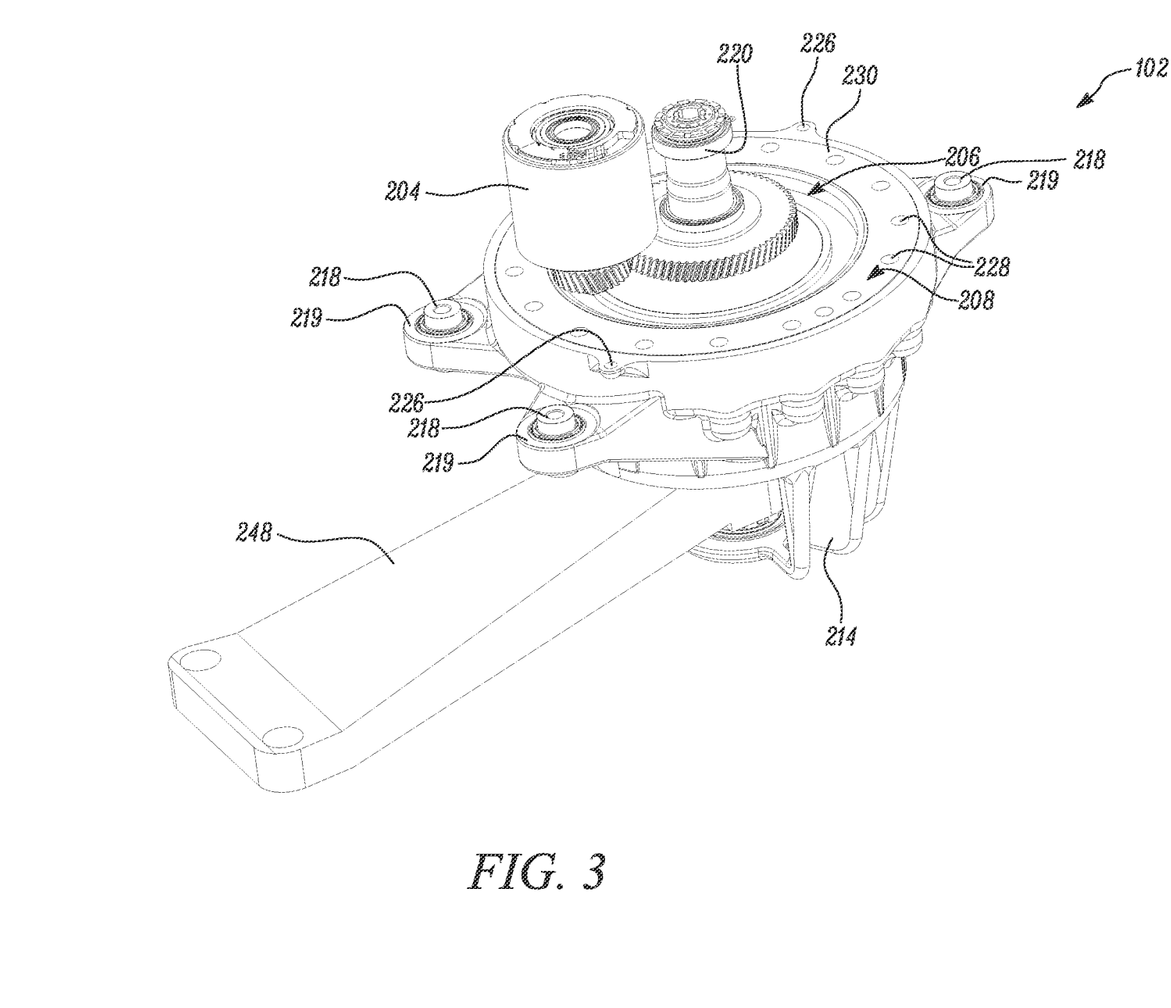
FIG. 3 illustrates a perspective view of the steering system without a top cover, according to certain embodiments of the disclosure.
Figure 4:
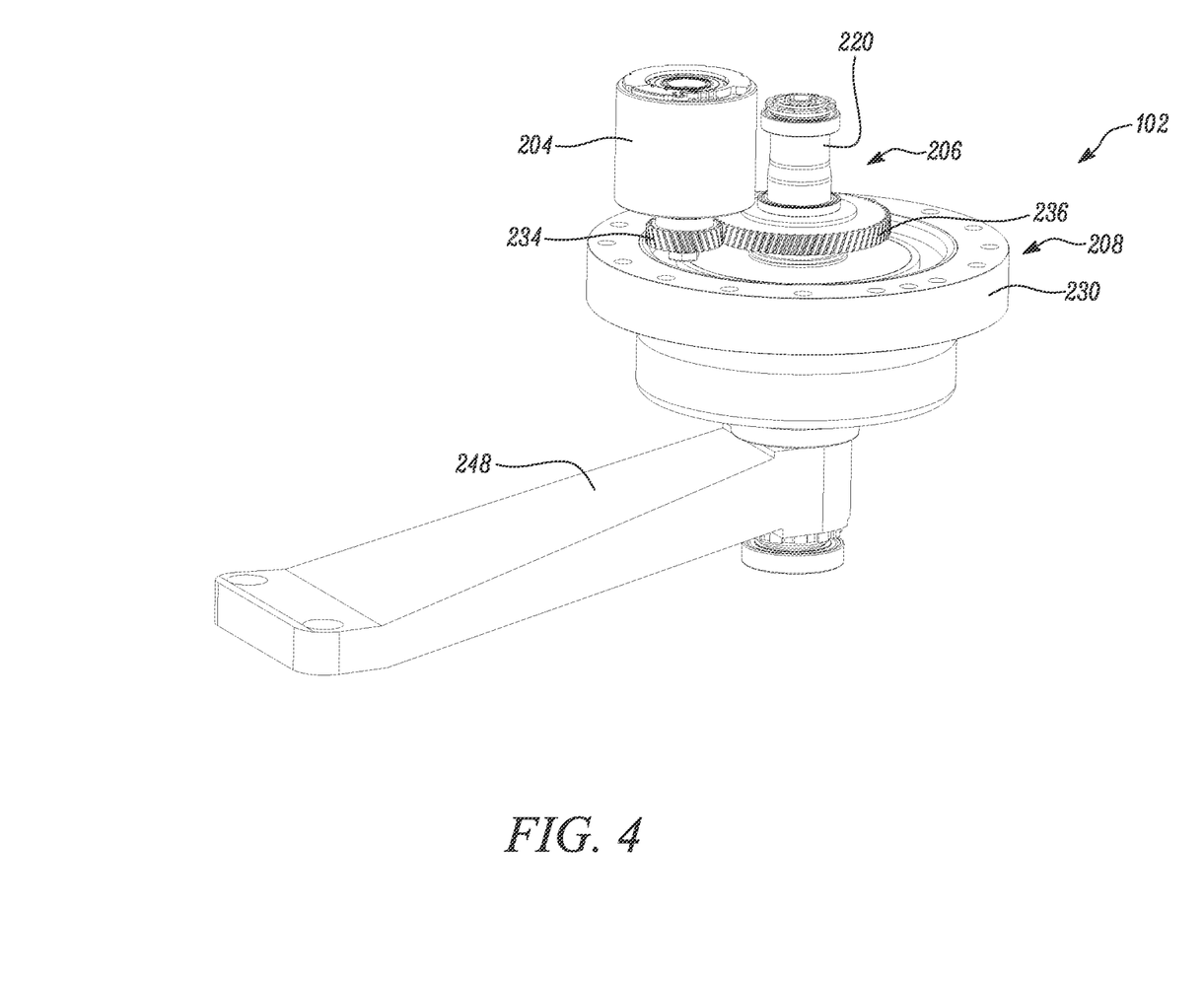
FIG. 4 illustrates a perspective view of the steering system without the top cover and a bottom cover, according to certain embodiments of the disclosure.

FIGS. 2A to 2C show different perspective views of steering system 102. Steering system 102 includes a housing 202. Housing 202 at least partially encloses components of steering system 102, for example a drive motor 204, a first gear reduction stage 206, a second gear reduction stage 208, and an output shaft 210 that are shown in FIGS. 3 to 6. Housing 202 includes a top cover 212 and bottom cover 214. Top cover 212 encloses an intermediate shaft 220 (shown in FIGS. 3 to 6) and first gear reduction stage 206. Further, bottom cover 214 of housing 202 receives second gear reduction stage 208 and output shaft 210 (shown in FIGS. 5 and 6). Additionally, a cover plate 216 covers drive motor 204 and intermediate shaft 220. Cover plate 216 is removably connected to top cover 212 using mechanical fasteners 217.

Top cover 212 is removably connected to bottom cover 214 in order to aid assembly and allow access to components that are mounted within housing 202 for service or replacement purposes. In one example, top cover 212 is connected to bottom cover 214 using a first set of mechanical fasteners 222 and a second set of mechanical fasteners 224. More particularly, a first set of apertures (not shown) on top cover 212 aligns with a first set of apertures 226 (shown in FIGS. 3 and 4) on bottom cover 214 to receive first set of mechanical fasteners 222. Further, a second set of apertures (not shown) on top cover 212 aligns with a second set of apertures 228 (shown in FIGS. 3 and 4) on an outer spline 230 to receive second set of mechanical fasteners 224. First and second sets of mechanical fasteners 222, 224 may include any one of bolts, screw, rivets, pin, or any other suitable mechanical fastener. Further, housing 202 may include one or more sealing devices (not shown) for sealing housing 202 in order to avoid leakage of lubricants that may be used to lubricate various components of steering system 102. For example, sealing devices may include O-rings.

Figure 5:
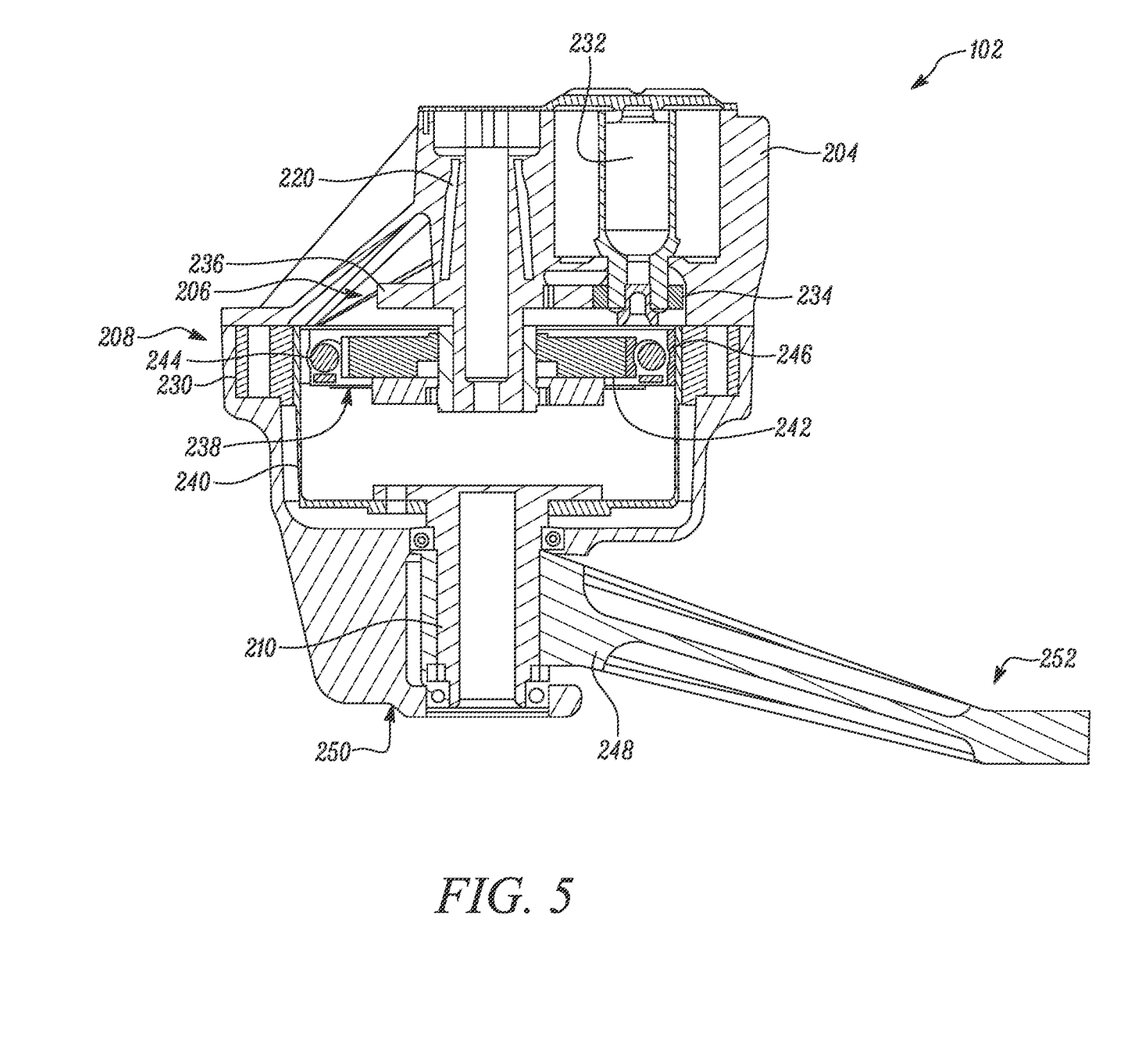
FIG. 5 illustrates a sectional view of the steering system, according to certain embodiments of the disclosure.

As shown in FIG. 5, steering system 102 includes drive motor 204. Drive motor 204 may be powered by an electric system of vehicle. The electric system may include an alternator or an energy storage device (for example, a battery) for supplying power to the drive motor 204. Drive motor 204 is embodied as a high speed electric motor having a stator and a rotor. Drive motor 204 may operate at the peak torque during execution of a turn in a parking lot. Further, drive motor 204 may operate at a continuous torque of 9.5 N/m that is delivered at more than 2000 RPM, based on application requirements. Continuous torque may be a torque applied during normal operation of vehicle. Drive motor 204 includes a motor shaft 232. Motor shaft 232 is connected to first gear reduction stage 206 at an output side of motor shaft 232.

First gear reduction stage 206 of steering system 102 will be now explained in detail with reference to FIG. 5. According to one embodiment of the present disclosure, first gear reduction stage 206 provides a gear reduction. In embodiment, the gear ratio is between 2:1 to 3:1. In embodiment, the gear ratio is 2.5:1. First gear reduction stage 206 of steering system 102 may include a helical gear engagement. Alternatively, first gear reduction stage 206 of steering system 102 may include a spur-gear engagement. First gear reduction stage 206 receives a first rotational input from motor shaft 232 and provides a first rotational output to second gear reduction stage 208.

First gear reduction stage 206 includes a first gear 234 and a second gear 236. First gear 234 is connected to motor shaft 232 of drive motor 204 and is rotated by motor shaft 232. Further, first gear 234 receives the first rotational input from motor shaft 232. Second gear 236 meshes with first gear 234 and is driven by first gear 234 in a rotary manner. In an embodiment, first and second gears 234, 236 are helical gears. In such a case, the first and second gears 234, 236 are meshed via a helical gear mesh. In an alternate embodiment, first and second gears 234, 236 are spur gears.

As shown in FIG. 5, an intermediate shaft 220 is connected to second gear 236. Intermediate shaft 220 is substantially parallel to motor shaft 232. Further, intermediate shaft 220 may be rotatably mounted within housing 202 via one or more bearings (not shown). Intermediate shaft 220 is driven by second gear 236 to provide the first rotational output from first gear reduction stage 206 to second gear reduction stage 208. In an embodiment, intermediate shaft 220 is connected to steering column in order to receive manual inputs from the driver. Specifically, intermediate shaft 220 receives a second rotational input from the steering column.

Second gear reduction stage 208 of steering system 102 will be now explained in detail with reference to FIG. 5. In an embodiment, second gear reduction stage 208 provides a gear reduction of between 140:1-185:1. In another embodiment, second gear reduction stage 208 provides a gear reduction ratio of 160:1. Second gear reduction stage 208 may include a strain wave gearing. Alternatively, second gear reduction stage 208 may include a worm drive or a planetary gear system. In other embodiments, the second gear reduction stage 208 includes any combination of a strain wave gearing, a worm drive, a planetary gear system, or another gearing system. Second gear reduction stage 208 receives the first rotational output from intermediate shaft 220 of first gear reduction stage 206 and provides a second rotational output to output shaft 210.

In an embodiment, second gear reduction stage 208 includes an ovular coupler 238, a flexible coupling 240, and outer spline 230. Ovular coupler 238 is arranged to be rotated by second gear 236 of first gear reduction stage 206. Specifically, ovular coupler 238 is connected to intermediate shaft 220 to receive the first rotational output. Further, as shown in FIG. 5, flexible coupling 240 provides the second rotational output to output shaft 210. Alternatively, outer spline 230 provides the second rotational output to output shaft 210.

Ovular coupler 238 is elliptical in shape and includes a cam 242. Additionally, second gear reduction stage 208 includes multiple bearing members 244 that are disposed between ovular coupler 238 and flexible coupling 240. During an assembly of second gear reduction stage 208, cam 242 of ovular coupler 238 is inserted between bearing members 244. That is, the bearing members 244 are arranged in an elliptical shape around the ovular coupler 238. In one example, bearing members 244 are embodied as ball bearings. However, bearing members 244 may embody any other type of roller bearings.

Further, flexible coupling 240 is cup-shaped and circumferentially surrounds ovular coupler 238. More particularly, ovular coupler 238 is mounted within flexible coupling 240 and is elastically deformable by ovular coupler 238 during rotation of ovular coupler 238. Flexible coupling 240 fits tightly over bearing members 244 and contacts an outer ring 246 of bearing members 244, such that when ovular coupler 238 rotates, flexible coupling 240 deforms to an elliptical shape but does not rotate with ovular coupler 238. Flexible coupling 240 includes a number of teeth on an outer circumference of flexible coupling 240.

Second gear reduction stage 208 also includes outer spline 230. Outer spline 230 meshes with flexible coupling 240. Outer spline 230 may be a rigid circular ring with teeth on an inner circumference of outer spline 230. Flexible coupling 240 is mounted within outer spline 230, thus, teeth of outer spline 230 are in mesh with teeth of flexible coupling 240. However, as flexible coupling 240 elliptically deforms, teeth of flexible coupling 240 only mesh with teeth of outer spline 230 in two regions on opposite sides of flexible coupling 240, along a major axis of the ellipse defined by the ovular coupler 238. Further, the number of teeth on flexible coupling 240 are less than a number of teeth on outer spline 230. For example, flexible coupling 240 may include two teeth less than number of teeth on outer spline 230.

Second gear reduction stage 208 is designed such that rotation of ovular coupler 238 results in a much slower rotation of flexible coupling 240 in an opposite direction, thus providing a high gear reduction ratio. More particularly, when ovular coupler 238 rotates, flexible coupling 240 elastically deforms and a meshing point between flexible coupling 240 and outer spline 230 moves around circumferentially. Further, as point of engagement between flexible coupling 240 and outer spline 230 travels circumferentially for one revolution due to the rotation of ovular coupler 238, a relative rotation occurs between flexible coupling 240 and outer spline 230. The relative rotation between flexible coupling 240 and outer spline 230 results in the high gear reduction ratio in second gear reduction stage 208. Second gear reduction stage 208, as described above, is a compact and light weight unit that provides a high gear reduction ratio in a small volume, which in turn results in steering system 102 to have a high gear reduction ratio.

Further, second gear reduction stage 208 provides the second rotational output to output shaft 210. Output shaft 210 is connected to flexible coupling 240 to receive the second rotational output. In one example, output shaft 210 is coaxial with intermediate shaft 220 and substantially parallel to motor shaft 232. Additionally, steering system 102 of vehicle includes a pitman arm 248. Pitman arm 248 is connected to output shaft 210 at an input side 250. Further, an output side 252 of pitman arm 248 is operably connected to each wheel 104 of vehicle via a tie-rod 254 (shown in FIG. 1) and a linkage 256 (shown in FIG. 1). Output shaft 210 drives the pitman arm 248 which in turn drives the wheels 104 via respective tie-rods 254 and linkages 256. In some embodiments, steering system 102 has been shown to provide a 10% improvement over a hydrolytic steering system. Additionally, steering system 102 is a compact unit that consumes lesser space as compared to other steering systems that are commercially available in markets. Further, steering system 102 does not require large amount of additional power for operation.

Figure 6:
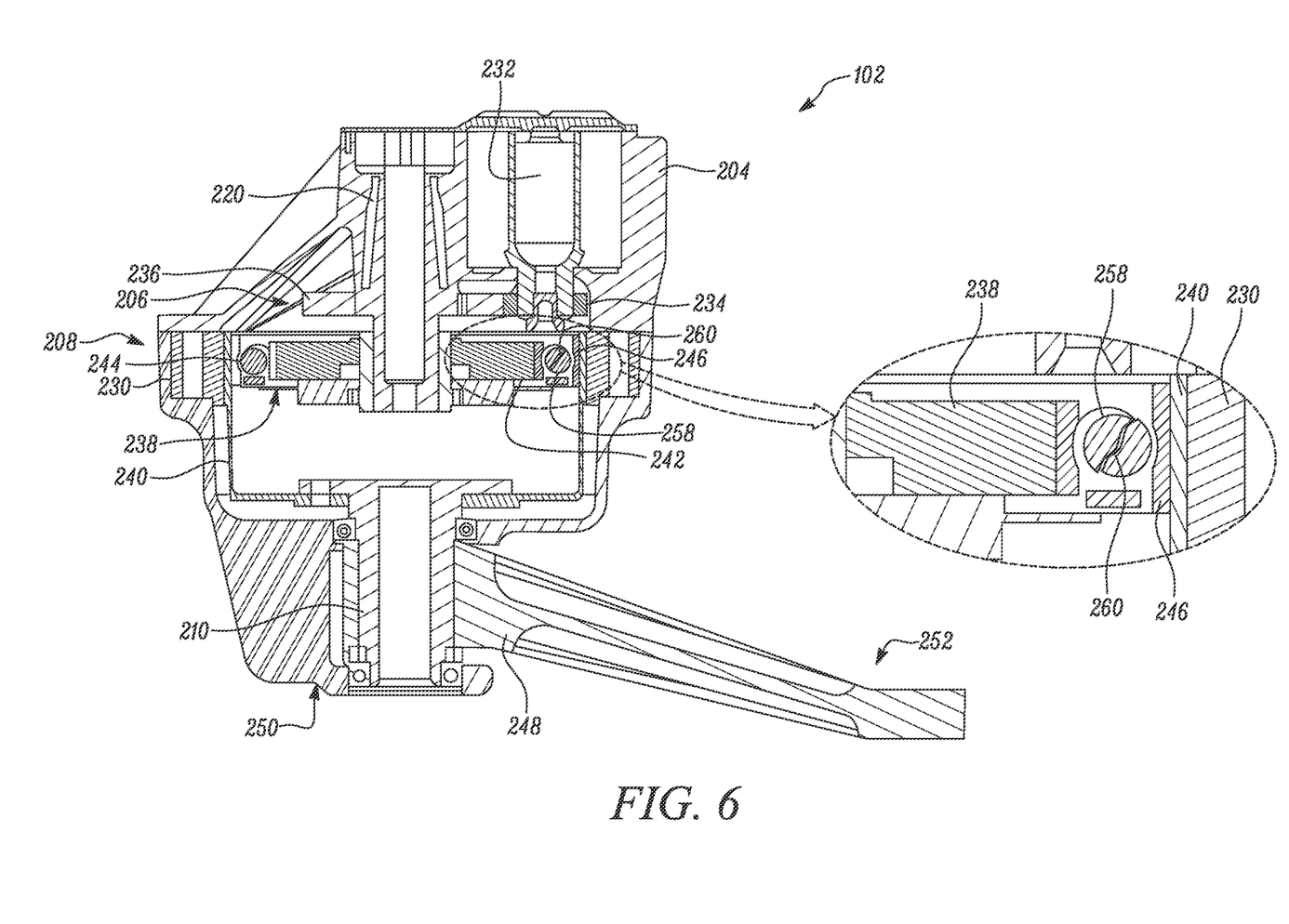
FIG. 6 illustrates a sectional view of a failure mode of the steering system, according to certain embodiments of the disclosure.

FIG. 6 illustrates a failure mode of steering system 102 in which one or more bearing members 244 of steering system 102 fail. Bearing members 244 of steering system 102 are designed to withstand high loads so that they do not fail during normal vehicle operation. However, bearing members 244 may be designed to withstand only a predetermined threshold of load. As a result, bearing members 244 fail when they are loaded beyond the predetermined threshold. For example, a bearing member 258 may eventually fail along a shear plane 260 when loaded beyond the predetermined threshold. Alternatively, bearing members 244 may undergo a bending failure, or any other type of failure.

In such a situation, one bearing member 244 is a sacrificial or failsafe components, thereby safeguarding other components of vehicle, for example, drive motor 204 or an engine, against breakdown or seizing. More particularly, the one bearing members 244 fails, ovular coupler 238 locks and rotates with flexible coupling 240. Thus, steering system 102 can still be operated to allow vehicle to be driven for a certain distance and parked at an appropriate location. Bearing member 244 fails according to a sheer mechanism or another failure mechanism. Further, failed bearing member 258 can be replaced and vehicle can be reinstated without incurring any additional losses.

Figure 7:
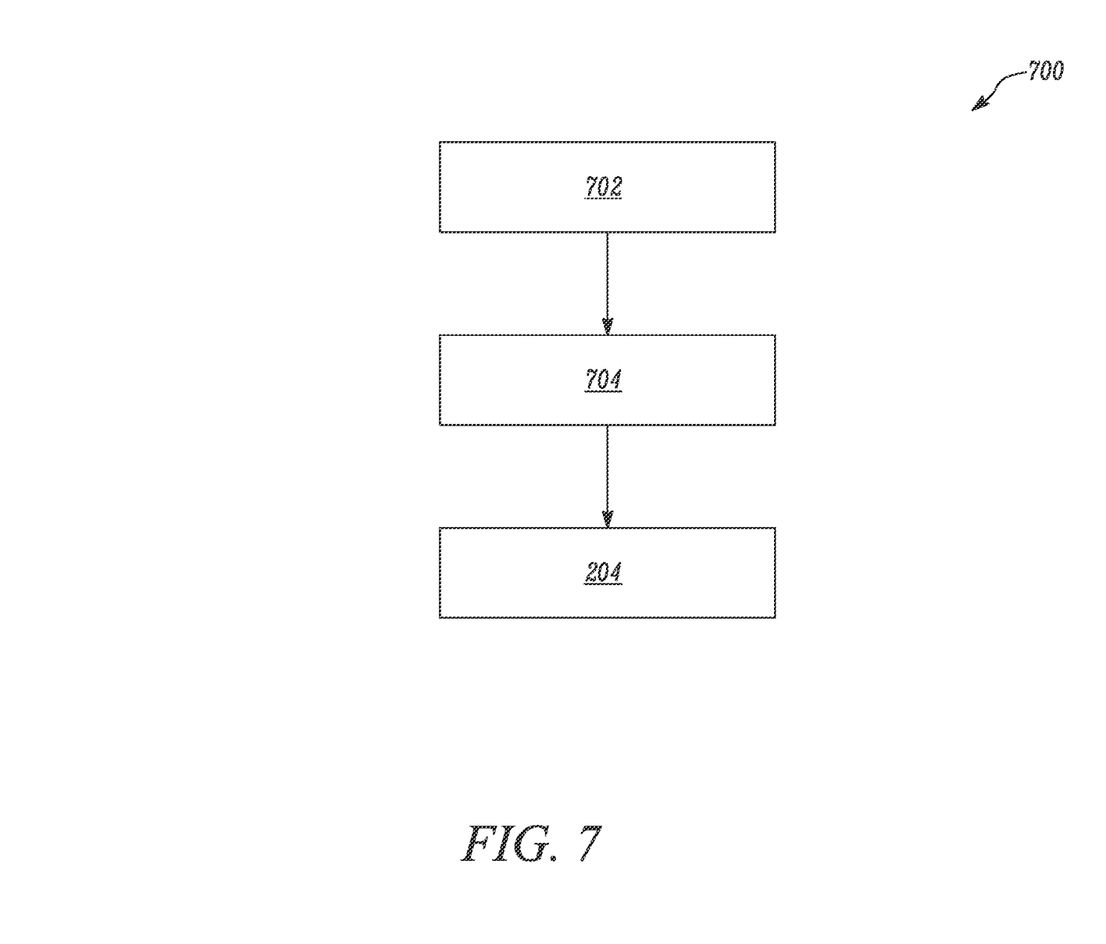
FIG. 7 illustrates a block diagram of a steering control system for controlling the steering system, according to certain embodiments of the disclosure.

FIG. 7 illustrates a block diagram of steering control system 700 that actuates and controls the operation of steering system 102. The steering control system 700 can be associated with an autonomous vehicle, a semi-autonomous vehicle, or a manually controlled vehicle. Steering control system 700 actuates and controls an operation of drive motor 204. In one embodiment, steering control system 700 embodies a steer-by-wire system that uses electronic or electro-mechanical components for actuating and controlling drive motor 204.

Steering control system 700 controls drive motor 204 based on various operating inputs. The operating inputs may be generated by one or more sensors 702 that are already present on vehicle. A controller 704 receives the operating inputs from sensors 702 and generate control signals for actuating or controlling drive motor 204 that is communicably connected to controller 704. Further, operating inputs may include, for example, steering wheel inputs from driver, speed of vehicle, or any other suitable vehicle inputs. In one example, steering wheel inputs include angle of steering wheel, torque of steering wheel, and a direction of rotation of steering wheel. Further, based on the direction of rotation of steering wheel, controller 704 changes a direction of rotation of drive motor 204 for steering of wheels 104. Alternatively, steering system 102 includes a selectively engageable idler gear (not shown) to change a steering direction of wheels 104.

Controller 704 may be embodied as a separate unit or functions of controller 704 may be integrated into the controller of vehicle, such as an Electronic Control Unit (ECU). Also, when the vehicle is embodied as an autonomous vehicle, controller of vehicle may generate and send inputs to various components of vehicle in order to operate the vehicle. In such an example, controller 704 autonomously controls steering of the wheels 104. Alternatively, for manually operated vehicles, controller 704 receives inputs from the driver of the vehicle and accordingly controls drive motor 204 for steering the wheels 104.

Although various aspects of steering system 102 are described in an environment of vehicles, steering system 102 may also be used in any other application area as well which may allow use of steering systems.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed steering system. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, etc.) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A steering system for a vehicle, the steering system comprising:
    a drive motor comprising a motor shaft;
    a first gear reduction stage for receiving a first rotational input from the motor shaft and providing a first rotational output;
    a second gear reduction stage comprising:
        an ovular coupler for receiving the first rotational output from the first gear reduction stage,
        a flexible coupling for providing a second rotational output, wherein the flexible coupling circumferentially surrounds the ovular coupler, and wherein the flexible coupling is elastically deformable by the ovular coupler during rotation, and
        a plurality of bearing members disposed between the ovular coupler and the flexible coupling; and
    an output shaft for receiving the second rotational output from the flexible coupling of the second gear reduction stage.

2. The steering system of claim 1, wherein the first gear reduction stage comprises:
    a first gear connected to the motor shaft of the drive motor for receiving the first rotational input;
    a second gear meshed with the first gear; and
    an intermediate shaft connected to the second gear for providing the first rotational output to the second gear reduction stage.

3. The steering system of claim 2, wherein a mesh between the first gear and the second gear is via a helical-gear mesh.

4. The steering system of claim 1, wherein the second gear reduction stage comprises at least one of a strain wave gearing, a worm drive, and a planetary gearing.

5. The steering system of claim 1, wherein the second gear reduction stage comprises an outer spline in meshed with the flexible coupling.

6. The steering system of claim 1, wherein the output shaft is connected to the flexible coupling for receiving the second rotational output.

7. The steering system of claim 1, further comprising a pitman arm connected to the output shaft, wherein the pitman arm is operably coupled to at least one steerable wheel of the vehicle.

8. The steering system of claim 1, further comprising a housing adapted to at least partially enclose therein the drive motor, the first gear reduction stage, the second gear reduction stage and the output shaft.

9. A steering system for a vehicle, the steering system comprising:
    a drive motor comprising a motor shaft;
    a first gear arranged to be rotated by the motor shaft;
    a second gear rotatably driven by the first gear;
    an ovular coupler arranged to be rotated by the second gear;
    a flexible coupling circumferentially surrounding the ovular coupler, wherein the flexible coupling is elastically deformable by the ovular coupler during rotation;
    a plurality of bearing members disposed between the ovular coupler and the flexible coupling;
    an outer spline meshed with the flexible coupling; and
    an output shaft arranged to be rotated by the flexible coupling.

10. The steering system of claim 9, wherein the first gear is meshed with the second gear via a helical hear mesh.

11. The steering system of claim 9, further comprising an intermediate shaft for connecting the second gear to the ovular coupler.

12. The steering system of claim 9, further comprising a pitman arm connected to the output shaft,
wherein the pitman arm is operably coupled to at least one steerable wheel of the vehicle.

13. The steering system of claim 9, further comprising a housing adapted to at least partially enclose therein the drive motor, the first gear, the second gear, the ovular coupler, the flexible coupling, the outer spline and the output shaft.

14. A steering system for a vehicle having at least one steerable wheel, the steering system comprising:
a drive motor comprising a motor shaft;
a first gear arranged to be rotated by the motor shaft;
a second gear rotatably driven by the first gear;
an ovular coupler arranged to be rotated by the second gear;
a flexible coupling circumferentially surrounding the ovular coupler, wherein the flexible coupling is elastically deformable by the ovular coupler during rotation;
an outer spline meshed with the flexible coupling;
an output shaft arranged to be rotated by the flexible coupling;
a pitman arm arranged to be rotated by the output shaft, wherein the pitman arm is operably coupled to the at least one steerable wheel of the vehicle; and
at least one tie rod connected to the pitman arm.

15. The steering system of claim 14, wherein first gear meshes with the second gear via a helical hear mesh.

16. The steering system of claim 14, further comprising an intermediate shaft for connecting the second gear to the ovular coupler.

17. The steering system of claim 14, further comprising a plurality of bearing members disposed between the ovular coupler and the flexible coupling.

* * * * *